Nov. 18, 1958 M. W. TURNER 2,860,442
BOBBERS WITH WATER-RELEASED LINE CASTING REELS
Filed Sept. 24, 1957 2 Sheets-Sheet 2
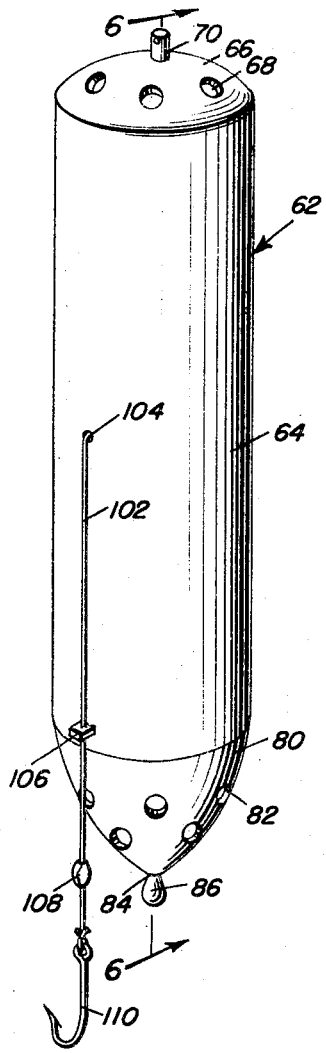
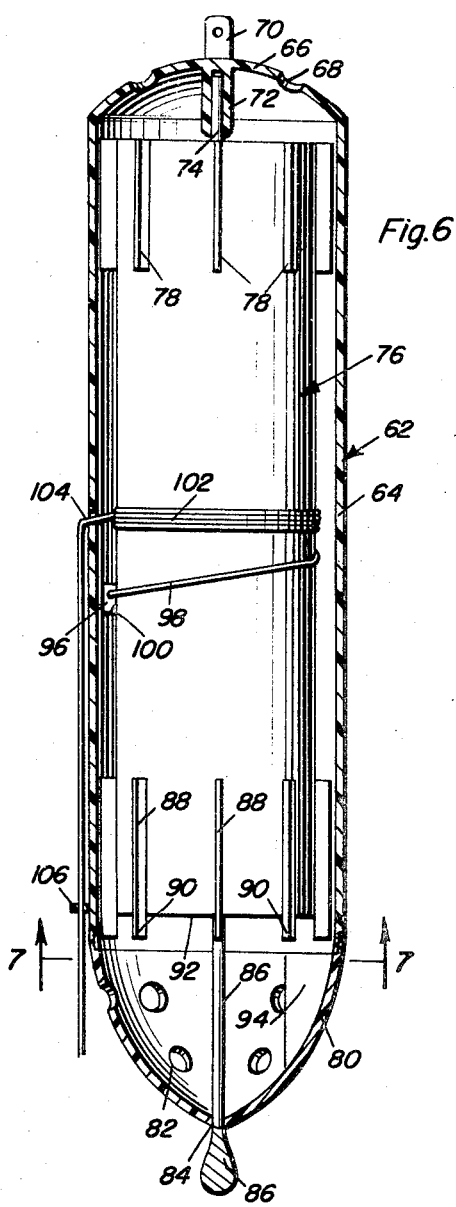
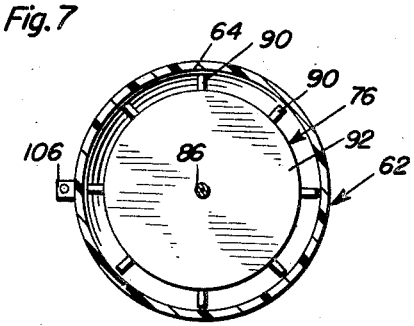
Marion W. Turner
INVENTOR.

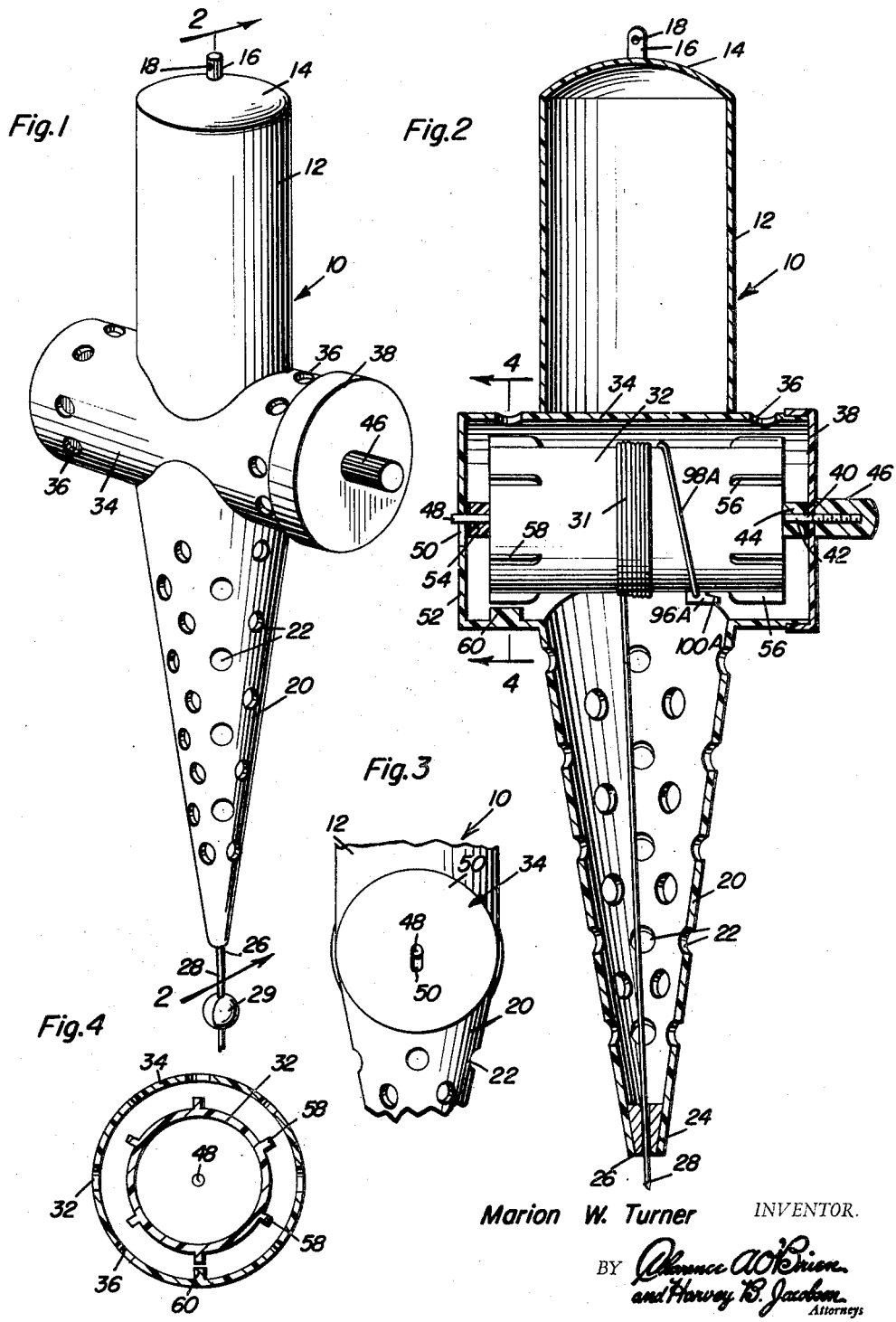

United States Patent Office 2,860,442
Patented Nov. 18, 1958

2,860,442

BOBBERS WITH WATER-RELEASED LINE CASTING REELS

Marion W. Turner, Puyallup, Wash.

Application September 24, 1957, Serial No. 685,909

6 Claims. (Cl. 43—43.11)

This invention relates to improved fishing bobbers each characterized by a hollow body containing a bouyant reel on which a baited sinker-equipped line or leader is wound and stored during a cast and is automatically released and unwinds when the bobber lands on the water's surface, and wherein the improvements in construction are such that the amount of the line which is to be used for fishing at a predetermined depth may be readily set and regulated.

An object of this invention is to structurally, functionally and otherwise improve upon my prior Patent No. 2,799,114 which, briefly considered, comprises a hollow bobber or body which is attached to a suitable casting line and which contains a reel on which the upper end of the baited fishing line is wound. It contains a reciprocable float which is movable toward and from the reel. The end of the float next to the reel is provided with a rubber or an equivalent disk which serves as a brake shoe when engaged with the reel and keeps the reel from turning. When disengaged, it releases and allows the reel to turn freely and the fishing line to unwind and descend to the desired depth in the water, the reel remains stationary during the cast and the fishing line remains wound thereon. However, as soon as the bobber comes to rest at the end of the cast, the reel is automatically released and the line pays out for use for fishing at the desired distance above the bottom of the water.

As will be evident from a general survey of the overall disclosure, two forms or embodiments are shown and claimed. One embodiment, more than the other is structurally and functionally similar to Pat. No. 2,799,114 but is, nevertheless, structurally distinct. That is to say, it (Figs. 1 to 4, inclusive) comprises a hollow bobber body which is adapted to assume a given vertical position in the water, said body being elongated in form and having a lower end portion provided with a centrally bored lead bushing. The upper portion of said body is imperforate and provides a float and is axially aligned with said lower end portion. The intervening or median portion is characterized by an apertured reel housing. A buoyant reel is mounted in said housing and a fishing line passes upwardly through the lower portion of the body, the lower end of the line carrying a sinker situated below the lower end of the body. The upper end of the line is adjustably connected to said reel and is adapted to be wound on said reel. The reel, being buoyant, provides a second float. The reel housing is open at one end and provided with a closure at said one end. The reel is removably mounted in said housing and is bodily insertable and removable by way of said openable end. The reel housing has an inwardly projecting lug serving as a retaining catch. Circumferentially spaced rigid fins on the surface or periphery of the reel are selectively and releasably engageable with the lug. There is a line anchoring and adjusting cleat fixed on the periphery of the surface of the reel for line adjusting needs.

Also, and as will be further clarified from the succeeding disclosure, except for the shape of the bobber (Figs. 5 to 7) the latter is quite similar to the embodiment disclosed in Figs. 1 to 4, inclusive. That is to say, both embodiments are characterized by an enclosed reel, said reel having a winding stem and suitably supported axle means. Both reels have fins that serve the same purposes and on both types the reel is lifted from a stationary locking lug or catch, this being accomplished by water which acts on and floats the reel so that it can turn freely. In fact, one might say broadly that the main difference between the two embodiments is that when they are in operation one form (Figs. 5 to 7) is vertical in operation and the other form (Figs. 1 to 4 inclusive) is characterized by a horizontal reel and housing.

Other objects, features and advantages will become more readily apparent from the following description and the accompanying drawings.

In the drawings:

Fig. 1 is a perspective view of one embodiment of the improved bobber;

Fig. 2 is a section on the line 2—2 of Fig. 1 with the reel and line appearing in elevation;

Fig. 3 is a fragmentary end view of the reel housing observing the same in the direction from left to right;

Fig. 4 is a section on line 4—4 of Fig. 2;

Fig. 5 is a perspective view of a second embodiment of the invention;

Fig. 6 is a view on an enlarged scale with parts in elevation taken on the plane of the line 6—6 of Fig. 5; and Fig. 7 is a cross section on the line 7—7 of Figure 6.

With reference to Figs. 1 to 4, inclusive, the hollow bobber body is denoted as an entity by the numeral 10, and comprises an imperforate upper cylindrical portion 12 which is imperforate and provides a float. The upper end 14 is provided with a stem 16 having a hole 18 to accommodate an end portion of the fishing line proper (not shown). The lower end portion of the body is axially aligned with the upper portion 12, is tapered downwardly and provides a truncated cone, said lower portion 20 having water circulating ports or apertures 22 therein. A lead bushing or an equivalent weight 24 is provided at the lower truncated end 26 and the lower end portion 28 of the leader or fishing line extends therethrough and is provided with a sinker 29. The extreme lower end is, in practice, provided with a baited hook (not shown). The line extends upwardly through the lower portion where it is wound at 31 on a second float 32. This float is confined for operation in the reel housing 34 situated at the juncture of the upper and lower portions 12 and 20 of the body. The reel housing is also provided with circulating ports 36 and at one end is open and provided with a friction retained removable closing cap 38 centrally provided with a bearing hole 40 for an axially disposed outstanding shaft 42 on the right hand end portion of the float or reel 32. The numeral 44 designates a spacing collar and 46 a finger knob. The journal or shaft 48, at the left hand end of the reel, extends for rotation and sliding movement through a vertical elongated slot 50 in the end 52 of the reel housing. The numeral 54 designates a spacing collar.

The peripheral circumferentially spaced fins 56 at the right function to retard rotation of the reel. The similar radial circumferentially spaced shoulder forming fins 58 at the opposite end are selectively and releasably engaged with the fixed lug 60 projecting into the housing.

With reference to Figs. 5 to 7 the hollow bobber body 62 is characterized by a hollow cylindrical plastic or equivalent shell 64 the upper convex end 66 being provided with water circulating holes or apertures 68. The stem 70 serves to accommodate the fishing line proper (not shown). At the upper end and depending into the chamber there is an axial socketed member 72 providing a bearing for the adjacent end 74 of a shaft on the upper end of the buoyant reel 76. The shaft is slidable and rotatable in the bearing. The fins 78 are radial and circumferentially spaced and serve to retard rotation of the reel. The lower end portion is open to permit insertion and removal of the reel and is screw threaded to accommodate a screw threaded closing cap 80 having water circulation apertures or ports 82. The central hole 84 at the bottom of the cap 80 provides a bearing for the depending axial shaft 86 carried by the lower end of the float or reel. The end of the shaft extending beyond the bearing is provided with a finger grip 86 which is preferably of sufficient weight to assist in maintaining the bobber erect when in the water. The radial circumferentially spaced fins 88 have lower end portions 90 projecting below the lower end 92 of the reel for releasable, as well as selective engagement, with the lug 94 fixed in the cap. A cleat 96 is fixed on the central peripheral portion of the reel and one end 98 of the leader line is attached thereto. The cleat has an overhanging finger or lip 100. The portion of the line 102 which is wound on the reel passes outwardly through a line passage 104 at the center of the body and the line then passes down through an apertured guide 106, the lower end being provided with a sinker 108 and a fishing hook 110, as seen in Fig. 5. Reverting to the correspondingly functioning float or reel 32 in Fig. 2 it will be seen that this is provided on its surface with a corresponding cleat 96A having an overhanging finger 100A to which the end portion 98A of the leader line is connected in the same manner seen in Fig. 6.

It will be evident that during the cast one of the stop shoulders or fins 58 is engaged with the lug 60 as in Fig. 2. Also, during the cast of the other form of the invention (Fig. 6) the extending ends 90 of the fins which also provide stop shoulders, are selectively and releasably engageable with the retaining catch or lug 94.

The operation of the bobber in Figs. 1 to 3 is as follows:

Assume that there is fifteen feet of the leader or line on the reel 32 and, further assume that the fisherman wishes to fish in five feet of water. First, he pulls five feet of line from the reel. Next, he removes the cap 38 and the entire reel assembly is removed as a unit. He then places the line under the lip 100A on the line anchor or cleat 96A and replaces the reel in the reel housing 34. Next he takes the winder or knob 46 between his thumb and forefinger and re-winds the line on the reel, holding the device in such a manner that the reel fins are not engaging the catch 60. He then holds the device upright and the reel fins will engage the catch 60 and prevent it from unwinding. He then makes the cast in the usual manner.

The line will not unwind from the reel portion during the cast and will remain stationary until the bobber settles in the water. Then the left hand end portion of the reel will float upwardly disengaging the fins 58 from the catch 60 and the reel is free to turn. The weight of the sinker will unwind the line to the place where it is placed under the lip 100A on the line anchor 96A, which in this case is five feet. He now fishes in the usual manner when using a bobber. When he retrieves the float and desires to make another cast the winding operation is repeated.

With respect to the operation of the form of the invention in Figs. 4 to 7, let us assume there is also fifteen feet of line on the floating reel 76. We will further assume that the fisherman desires to fish at five feet of water. First, he pulls off five feet of the line from the reel 76. Next, he removes the cap 80 and the entire reel assembly may be removed as a unit. He then places the line under the lip 100A on the line anchor and replaces the unit in the main chamber of the body 62.

The remaining stages of operation are as already described in connection with Figs. 1 to 3, inclusive.

Since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A fishing line casting and paying-out bobber wherein the amount of the line which is to be used for fishing in a body of water at a predetermined depth may be regulated comprising, an elongated hollow bobber body which is adapted to assume a given position when afloat in the water, said body having a portion provided with a multiplicity of water intake apertures, a fishing line storing, casting and paying-out reel mounted for rotation and bodily movement in and relative to said body, said reel being buoyant and at least one portion of said reel having circumferentially spaced radial fins on and around its peripheral surface, said fins functioning as selectively usable stop shoulders when the reel is initially set, and a lug fixed in said body serving as a retaining catch for said stop shoulders, one of the stop shoulders on said reel being releasably engaged with said lug during the time the bobber is being cast so that the reel is thus held against rotation until the bobber settles atop the water, said one stop shoulder being automatically released from the catch as soon as the reel is caused, by the water entering the bobber body, to float upwardly relative to the bobber body, whereby the reel is then free to rotate, a portion of said bobber body having a reel accommodating opening provided with a normally closed but manually removable closure permitting the reel to be temporarily removed from the body, said reel having a line regulating and anchoring cleat fixed on said peripheral surface, said body having a line passage, and a fishing line having its lower end portion equipped with a sinker, the upper end portion of said line being wound and stored on said reel for cooperation with said cleat, and a portion of said line passing slidingly through said line passage.

2. The structure defined in claim 1, and wherein said closure comprises a readily applicable and removable cap, said cap having a centrally located hole therein providing a bearing, at least one end of said reel being aligned with said cap and being provided with an axially disposed outstanding shaft journaled for rotation in said bearing, the outer end of the shaft extending not only through, but outwardly beyond, the bearing hole and cap and being provided with a finger gripping knob by way of which the reel may be turned by hand for line regulating and paying-out needs.

3. A fishing line casting and paying-out bobber wherein the amount of the line which is to be used for fishing in a body of water at a predetermined depth may be regulated comprising, an elongated hollow bobber body, said body being apertured and embodying a reel chamber which is open at one end, a removable closing cap for said one end, a buoyant line winding, storing and casting reel insertable into said chamber by way of said open end and held in operative position and against displacement by said cap, said cap having a centered bearing hole, said reel having an axial shaft with a finger knob on the outer end of the shaft, said shaft being journaled for rotation in said bearing hole, a line anchoring limiting cleat carried by said reel, circumferentially spaced radial fins carried by said reel and serving as selectively usable detents, and a lug fixed in said chamber, said lug serving as a holding catch with which a selected one of said relatively movable detents may be releasably and temporarily engaged, said chamber being of a length and cross-section greater than the length and cross-section, respectively, of the reel, and said reel being movable up and down in the chamber relative to the chamber so that said detent may clear and be disengaged from said catch.

4. A fishing line casting and paying-out bobber wherein the amount of the line which is to be used for fishing in a body of water at a predetermined depth may be regulated comprising, an elongated hollow bobber body, the upper end of said body being apertured, the lower end of said body being provided with a removable apertured closing cap centrally provided with an axially located bearing hole, said cap being provided on its interior with a fixed projecting lug providing a stationary retaining catch, a removable float movably arranged for operation in the hollow portion of said body and having a shaft extending axially from one end and mounted for rotation and sliding in said bearing hole, said shaft extending beyond the cap and having a finger knob, that end of the float adjacent said cap having circumferentially spaced radial fins with end portions projecting toward and releasably engageable with said catch, said float serving as a line winding, storing, casting, and paying-out reel, and being provided with a line anchoring and limit regulating cleat.

5. A fishing line casting and paying-out bobber wherein the amount of the line which is to be used for fishing in a body of water at a predetermined depth may be regulated comprising, an elongated hollow bobber body which is adapted to assume a given position when afloat in the water, said body being cylindrical in cross-section and having an upper apertured end portion provided with line attaching means, the lower end of said body being provided with an apertured removable closing cap having an axially centered bearing hole, an interiorly disposed bearing fixed to said upper end portion in axial alignment with said bearing hole, an elongated float slidingly confined for operation in the hollow chamber portion of said body, said float serving as a line winding and storing reel and being provided on its median surface with a line anchoring and limit regulating cleat, an axial shaft portion fixed on the upper end of said float and slidably and rotatably mounted in said bearing, a companion axial shaft portion secured to the lower end of the float and rotatable in and extending slidingly through and outwardly beyond the bearing hole and terminating in an accessible finger knob, radial circumferentially spaced fins carried on the peripheral surface of the lower end portion of said float, and a fixed lug carried interiorly on the cap with which said fins are selectively and releasably cooperable.

6. A fishing line casting and paying-out bobber wherein the amount of the line which is to be used for fishing in a body of water at a predetermined depth may be regulated, comprising an elongated hollow bobber body, the upper end of said body being apertured, the lower end of said body being provided with a removable apertured closing cap centrally provided with an axially located bearing hole, said cap being provided on its interior with a fixed projecting lug providing a stationary catch, a removable float movably arranged for operation in the hollow portion of said body and having a first shaft extending axially from the lower end and mounted for rotation and sliding in said bearing hole, said shaft extending beyond the cap and having a finger knob, the lower end of the float adjacent said cap having circumferentially spaced radial fins with end portions projecting toward and releasably engageable with said catch, said float serving as a line winding, storing, casting and paying out reel and being provided with a line anchoring and limit regulating cleat, a portion of said body between said upper and lower ends having a line passage, the upper end of said float having a second shaft extending upwardly and axially and slidingly and rotatingly mounted in a bearing provided therefor at the upper end of said body, said upper end of said float being provided with circumferentially spaced radial fins, and said cleat being mounted on a median portion of the surface of the float and said line passage being cooperatively adjacent said passage.

References Cited in the file of this patent

UNITED STATES PATENTS

| | | |
|---|---|---|
| 1,973,028 | Thomas | Sept. 11, 1934 |
| 2,669,054 | Smith | Feb. 16, 1954 |
| 2,799,114 | Turner | July 16, 1957 |